United States Patent Office 3,153,362
Patented Oct. 20, 1964

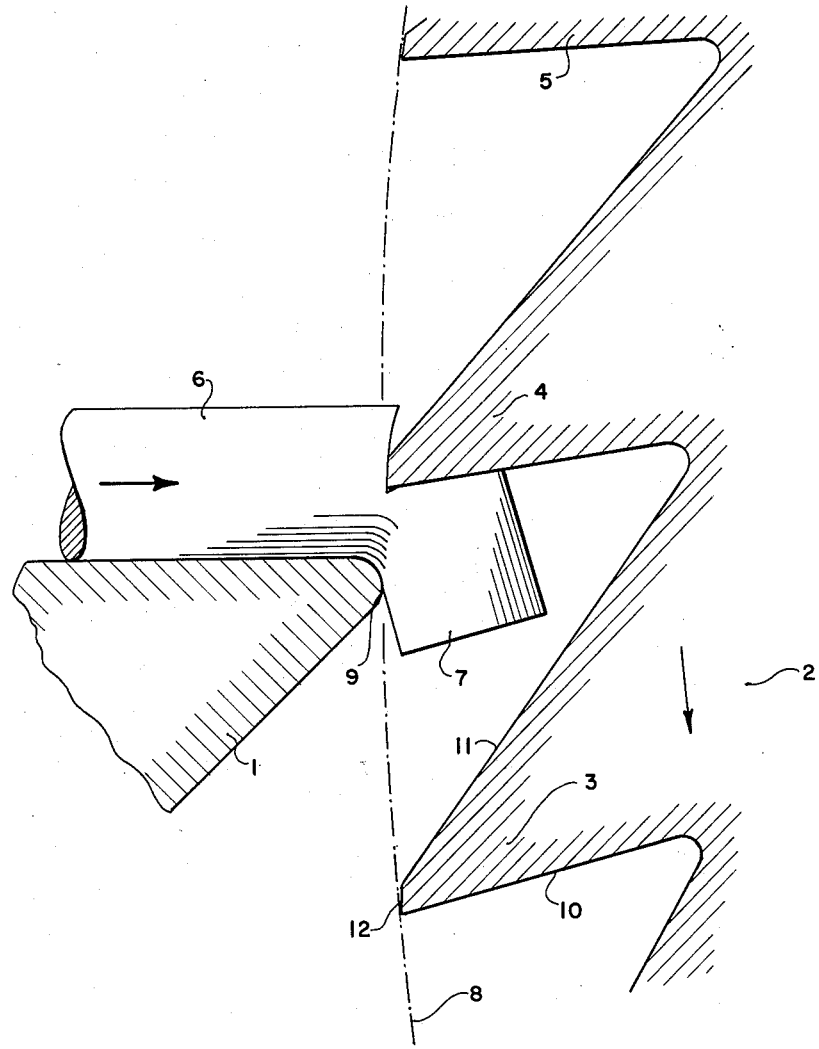

3,153,362
CHIPPING APPARATUS
James W. I. Heijnis, Arnhem, Netherlands, assignor to American Enka Corporation, Enka, N.C., a corporation of Delaware
Filed Jan. 29, 1962, Ser. No. 169,393
Claims priority, application Netherlands Feb. 24, 1961
5 Claims. (Cl. 83—355)

This invention relates generally to apparatus for cutting ribbon or banded thread-like products into chips and more particularly to the arrangement and design of blades on an otherwise conventional milling type chip cutter.

Various types of apparatus for cutting thermoplastic materials into what has become known as chips are widely used. This invention is particularly adaptable to a cutter of the rotary type utilizing a fixed blade for supporting and guiding ribbon fed thereover and a movable blade cooperating with the fixed blade for chopping or severing the leading end of ribbon periodically. A rotary machine of this type generally utilizes a milling type cutter having a plurality of cutting edges so disposed to sever the ribbon along a line normal to the direction of travel. The chips so obtained are subsequently injection-molded either into shaped articles or melt spun into yarn or threads. Generally, the ribbon or thread-shaped products are fed to the cutter as round threads having a thickness of 1.5 to 3 mm., the length of the chips usually being chosen such that it is equal to the thickness of the threads.

In processing the chips produced with known cutting apparatus, many unexpected difficulties occur. For example, injection-molded articles produced from colored chips sometimes have spots and stripes whereas the granular starting material had an absolutely homogeneous color. This same phenomenon sometimes occurs when casting colored films. Moreover, in melt-spinning threads from perfectly pure chips, it has occasionally been found that the filter in the spinning assembly becomes clogged very quickly.

Until now no satisfactory explanation has been found for these and other similar difficulties. A close examination of the chips obtained by the known apparatus, however, revealed that the chips appeared to have strongly deformed cut surfaces. In many places the material had been overheated and/or melted, and in other places the edges of the cut surfaces were frayed. Furthermore, in a sample of chipped polyamide material, comprising chips measuring 1½ mm. in length and 1½ mm. in thickness, 50 dust particles per chip measuring between 15 and 50 mu were counted. The material of these dust particles was found to be chemically identical with that of the chips. It was assumed that this dust and the fraying and over-heated spots on the cut surfaces of the chips were the cause of the above-described difficulties. The material of which the dust consists polymerizes further or degrades more than does the material of the chips and therefore gives rise to said clogging and discoloration.

Accordingly, it is an object of this invention to provide apparatus for chopping ribbon or thread-shaped thermoplastic material into chips, such chips being free from the disadvantages found in chips produced by known type apparatus.

Another object of this invention is to provide apparatus for chopping ribbon or thread-shaped thermoplastic material into chips without deforming the cut surfaces of the chips or producing overheated spots or fraying the edges.

A still further object of this invention is to provide apparatus for chopping ribbon or thread-shaped thermoplastic material into chips without producing chip dust.

These and other objects will become apparent from the following detailed description.

Essentially the present invention comprises a chipping apparatus in which the cutting edge or tip of the fixed blade is rounded, with the radius of curvature being between 0.15 to 0.5 times the thickness of the material to be chopped. A preferred radius is 0.2 times the material thickness. The clearance between the fixed blade and the path of the moving blades is less than 0.04 mm., preferably less than 0.02 mm. The angle between the sides of the fixed blade may vary depending on the nature of the material to be chopped. However, it is preferred that this angle be about 45°.

The moving blades may be assembled in a cutterhead, or they may be combined to form a single cylindrical milling cutter. Particularly good results are obtained when the leading sides of the moving blades are forwardly inclined to their direction of travel and make an angle of 70° to 90° relative to the path of the cutting edge. The trailing sides should have a bi-planar surface with that portion farthest away from the cutting edge making an angle of 15° to 40° with the path of the cutting edge and the portion nearest the cutting edge making a clearance angle of 5° to 10° relative to the path of the cutting edge. The width of this latter portion may vary from 0.1 to 1.0 mm. It has been found that as the angle between the leading side and the path of the cutting edge approaches 90°, the apparatus is more suitable for chopping relatively hard threads. Such threads may have been hardened, for example, by admixing the material of the threads with a pigment, such as $TiO_2$.

A better understanding of this invention may be had by referring to the following detailed description of the cutter taken in conjunction with the accompanying drawing, wherein the single figure represents a section transverse to the cutting edge of the cooperating knife blades of the apparatus.

The numeral 1 refers to the fixed blade as shown in section. Opposite this fixed blade is a cylindrical cutter 2 (only partially shown) rotatable in the direction indicated by the arrow. The numerals 3, 4 and 5 refer to successive cutting blades functioning as moving blades provided on the cylindrical surface of a milling cutter not shown. The milling cutter measures 10 cm. in diameter. Along its circumference 25 blades are distributed. Over the upper side of the fixed blade 1 a number of round threads 6 are transported side by side to the milling cutter in the direction indicated by the arrow. In the drawing, only one of such threads is shown. Each thread has a thickness of 1.5 mm. Every time a cutter blade engages thread 6 a chip 7 is severed, as is known to this art. The length severed of course depends on relative speed of thread feed and cutter rotation.

The fixed blade is positioned 0.02 mm. away from the path 8 described by the cutting edges of the milling cutter. The axis of the milling cutter is parallel to the cutting edge 9 of the fixed blade and lies in the plane of the upper side of this blade. The cutting edge 9 of the fixed blade has a radius of curvature of 0.3 mm.

The leading sides 10 of the moving cutter or blades are so positioned that the blades make a scooping movement at an angle of 80° with the path 8. The trailing sides of the moving cutter blades are bent, each being formed by two surfaces 11 and 12. The surfaces 11 are inclined at an angle of 40° with the path 8 and the surfaces 12 at an angle of 5° with the path 8. The surfaces 12 have a width of 0.25 mm.

It has been found that even at very high operating speeds the cutter of this invention will produce very clean and smooth chips with practically no dust. Such chips can be processed into molded articles without the spinning assembly becoming clogged. In addition, the molded articles produced therefrom are free from spots and stripes.

Using the apparatus of this invention chips may be obtained having very smooth cut surfaces without any unusual overheated or melted spots, or frayed edges. Furthermore, this invention satisfies a long standing desire to obtain a cutter capable of chopping the ribbon or thread-shaped material into chips while using a minimum amount of cutting energy. In this connection, it was assumed that it was always necessary for the cutting edges of the two cooperating blades to be as sharp as possible. Surprisingly, it has now been found that in addition to the above-mentioned advantages, the apparatus of this invention needs far less cutting energy than do the known types of apparatus.

It is to be understood that the above-identified arrangement is simply illustrative of the application of the principles of the invention. Numerous other arrangements may be readily devised by those skilled in the art without departing from the spirit and scope of the invention which is intended to be limited solely by the following claims.

What is claimed is:

1. A cutter for chopping ribbon or thread-shaped thermoplastic materials into chips comprising a fixed blade, at least one movable blade, means for guiding the material to be chopped along one side of the fixed blade in the direction of the cutting edge thereof and means for driving the movable blade whereby the cutting edge thereof passes along the cutting edge of the fixed blade in a path transverse to the direction of movement of the material, said fixed blade having a rounded cutting edge with a radius of curvature about 0.15 to about 0.5 times the thickness of the material to be chopped, and the clearance between the fixed blade and the path of the movable blade being less than about 0.04 mm.

2. The cutter of claim 1 in which the radius of curvature of the fixed blade cutting edge is 0.2 times the thickness of the material to be chopped.

3. The cutter of claim 1 in which the clearance between the fixed and movable blades is less than 0.02 mm.

4. The cutter of claim 1 in which the leading side of the movable blade is inclined to the direction of blade travel at an angle of 70°–90° relative to the path of the cutting edge and in which the trailing side consists of a bi-planar surface, the portion farthest from the cutting edge making an angle of 15° to 40° with the path of the cutting edge, and the portion nearest to the cutting edge being 0.1 to 1.0 mm. wide and making a clearance angle of 5° to 10° relative to the path of the cutting edge.

5. The cutter of claim 1 in which the angle between the sides of the fixed blade is about 45°.

References Cited in the file of this patent

UNITED STATES PATENTS 2,655,213     Anderson _____ Oct. 13, 1953

FOREIGN PATENTS 446,715     Canada _____ Feb. 17, 1948
580,251     Canada _____ July 28, 1959